US006938174B2

(12) United States Patent
LeKuch et al.

(10) Patent No.: US 6,938,174 B2
(45) Date of Patent: Aug. 30, 2005

(54) METHOD AND SYSTEM WITH ADAPTIVE DATA TRANSFER POLICY BASED ON A POWER STATE OF A COMPUTING DEVICE

(75) Inventors: Scott LeKuch, New York, NY (US); Ken Inoue, Elmsford, NY (US); Dan Peter Dumarot, Cornwall, NY (US); Mary R. Seminara, Ossining, NY (US); Sreenivasulu Kesavarapu, Terrytown, NY (US); John Peter Karidis, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 09/854,980

(22) Filed: May 14, 2001

(65) Prior Publication Data

US 2002/0042888 A1 Apr. 11, 2002

Related U.S. Application Data

(60) Provisional application No. 60/269,416, filed on Feb. 16, 2001, and provisional application No. 60/238,838, filed on Oct. 6, 2000.

(51) Int. Cl.[7] .............................. G06F 1/32; H04Q 7/20

(52) U.S. Cl. ....................... 713/320; 713/323; 709/203; 455/446

(58) Field of Search ................................. 713/320, 323; 178/18.01, 18.03; 709/203; 455/446

(56) References Cited

U.S. PATENT DOCUMENTS

| | | | | | |
|---|---|---|---|---|---|
| 5,294,792 | A | * | 3/1994 | Lewis et al. | 250/221 |
| 5,546,538 | A | * | 8/1996 | Cobbley et al. | 709/203 |
| 5,629,499 | A | * | 5/1997 | Flickinger et al. | 178/18.01 |
| 5,845,142 | A | * | 12/1998 | Hayasaka | 713/340 |
| 6,026,303 | A | * | 2/2000 | Minamisawa | 455/446 |
| 6,263,200 | B1 | * | 7/2001 | Fujimoto | 455/343.5 |
| 6,289,399 | B1 | * | 9/2001 | Furuichi et al. | 710/6 |
| 6,609,072 | B1 | * | 8/2003 | Yamagata | 702/64 |
| 6,678,831 | B1 | * | 1/2004 | Mustafa et al. | 713/320 |
| 6,691,233 | B1 | * | 2/2004 | Gannage et al. | 713/300 |

FOREIGN PATENT DOCUMENTS

JP 6-067766 * 3/1994

* cited by examiner

*Primary Examiner*—Chun Cao
(74) *Attorney, Agent, or Firm*—Ohlandt, Greeley, Ruggiero & Perle, L.L.P.; Casey P. August, Esq.; IBM Corporation

(57) ABSTRACT

The present invention pertains to a computing system having an input system with local storage interfaced with a computing device, wherein input information is transferred from the digitizer input system to the interfaced computing device based on an adaptive transfer policy that extends the battery life of the interfaced computing device. The interfaced computing device may be a PC. The digitizer input system can support automated, selective transfer policies based on the power management configuration of the PC interfaced with the digitizer input system and user-selected transfer policies.

32 Claims, 3 Drawing Sheets

METHOD AND SYSTEM WITH ADAPTIVE DATA TRANSFER POLICY BASED ON A POWER STATE OF A COMPUTING DEVICE

CROSS-REFERENCE TO RELATED APPLICATIONS

This application is related to U.S. patent application "EXTENDING THE GUI DESKTOP/PAPER METAPHOR TO INCORPORATE PHYSICAL PAPER INPUT", Ser. No. 09/854,978, filed on even date herewith for Applicants D. Dumarot, et al.; U.S. patent application "IMPROVED FRONT OF SCREEN, USER INTERFACE, AND NATIONAL LANGUAGE SUPPORT BY DOWNLOADING BITMAPS FROM PC TO COMPANION DEVICE", Ser. No. 09/854,977, filed on even date herewith for Applicants D. Dumarot, et al; U.S. patent application "THE USE OF A PAPER PAD WITH UNIQUELY IDENTIFIED PAGES IN A DIGITIZER SYSTEM", Ser. No. 09/854,976, filed on even date herewith for Applicants D. Dumarot, et al; and U.S. patent application "DATA STEERING FLIP PEN SYSTEM", Ser. No. 09/854,979, filed on even date herewith for Applicants D. Dumarot, et al.

This application claims the benefit under 35 U.S.C. 119(e) of U.S. Provisional Application No. 60/238,838, filed Oct. 6, 2000. and of U.S. Provisional Application No. 60/269,416, filed Feb. 16, 2001.

BACKGROUND OF THE INVENTION

1. Field of the Invention

This invention relates to the field of computer device systems, and more particularly this invention pertains to a digitizer input system having local storage and an adaptive data transfer policy for extending the battery of an interfaced computing device, such as a PC.

2. Description of the Prior Art

Personal computing devices, including PC's, are generally comprised of a number of systems. For instance, a PC may be comprised of a user interface, including at least one user input system; a graphics display system; a memory storage system; a power system; etc. PC systems add functionality to the PC. While adding desired functionality, PC systems also typically require the use of PC resources in order to operate and provide their desired functionality. For example, PC systems may rely on the CPU and memory device(s) of the PC for processing and storage of data, respectively. PC systems may also rely on the PC's power source for electrical power.

A digitizer input system is an example of a user input system. A digitizer input system typically has a pen input device (i.e., stylus) and a digitizer grid. The digitizer input system tracks the relative position of the input pen as the input pen is pressed on or near the digitizer grid as is known to those skilled in the art. The digitizer input system provides an apparatus and method for a user to input commands and other information, such as handwritten text, into the interfaced PC for use, processing, storage, and display. Prior art digitizer input systems rely on the CPU and storage devices of the interfaced PC for providing the necessary processing and storage means for tracking, processing, and storing the positional data generated by the digitizer input system. The additional use of the PC's resources, such as, but not limited to, the CPU and memory requires the PC to use additional electrical power.

Portable companion computing devices, including PCs and other devices having input device systems, are becoming increasingly popular. Portable computing devices typically use a battery as a source of electrical power. Due to a companion computing system's reliance on the resources (e.g, the CPU and/or memory) of the PC interfaced with the companion computing system, companion computing systems tend to decrease the useful battery life of the computing device (e.g., PC) interfaced thereto.

SUMMARY OF THE INVENTION

It is an objective of this invention to provide an input device system that adaptively and intelligently transfers data input therein to an interfaced computing device in a manner that minimizes the consumption of battery resources of the interfaced computing device.

The foregoing and other problems are overcome and the objects of the invention are realized by methods and apparatus in accordance with the invention disclosed herein. The teachings herein pertain to a computing system having a PC (personal computer) and a digitizer input system interfaced thereto that maximizes PC battery life according to an adaptive data transfer policy of the digitizer input system that intelligently manages the transfer of information between the digitizer input system and the PC. The adaptive data transfer policy may dynamically, hierarchically cache the input signals from the digitizer's stylus (i.e., pen) input. The digitizer input system can support automated, selective transfer policies based on the power management configuration of the PC interfaced with the digitizer input system. The digitizer input system's transfer policies can be user-selected.

As an example of an adaptive transfer policy for extending the battery of a PC, an interfaced digitizer input system operates such that when the PC interfaced with the digitizer input device system is Off, all of the input to the digitizer input device system can be stored or buffered in memory of the digitizer input system and not transferred to the connected PC. In this manner, the PC interfaced with the digitizer input device system does not need to be turned on in order to store the input data acquired by the digitizer's input pen. It should be noted that the digitizer input system of the present invention has its own local memory device and CPU for providing the requisite storage and processing needs, respectively, of the digitizer input system.

In the case that the PC is powered on but operating in a Low Power (i.e., power conserving) state, data acquired by the digitizer input system can be transferred to the PC at intermittent intervals in order to minimize PC processing requirements and to thereby extend the battery life of the PC. In the case when the PC is operating in a Normal, Fully Powered state, all of the input pen data is transferred in real-time or substantially real-time to the PC, optionally without buffering the digitizer input system acquired data, in order to provide maximum PC system responsiveness.

The transfer policy of the digitizer input system is not limited to the criteria used in the above example. The digitizer input system's transfer policy can adapt the transfer of information from the digitizer input system to the PC based on, for example, the rate at which the digitizer input system detects input data, power management settings of the PC, user-selected settings such as the level of desired PC responsiveness, and a combination of these and/or other factors.

BRIEF DESCRIPTION OF THE DRAWINGS

The above set forth and other features of the present teachings are made more apparent in the ensuing Detailed Description of the Invention when read in conjunction with the attached Drawings, wherein.

DETAILED DESCRIPTION OF THE INVENTION

Figure 1:
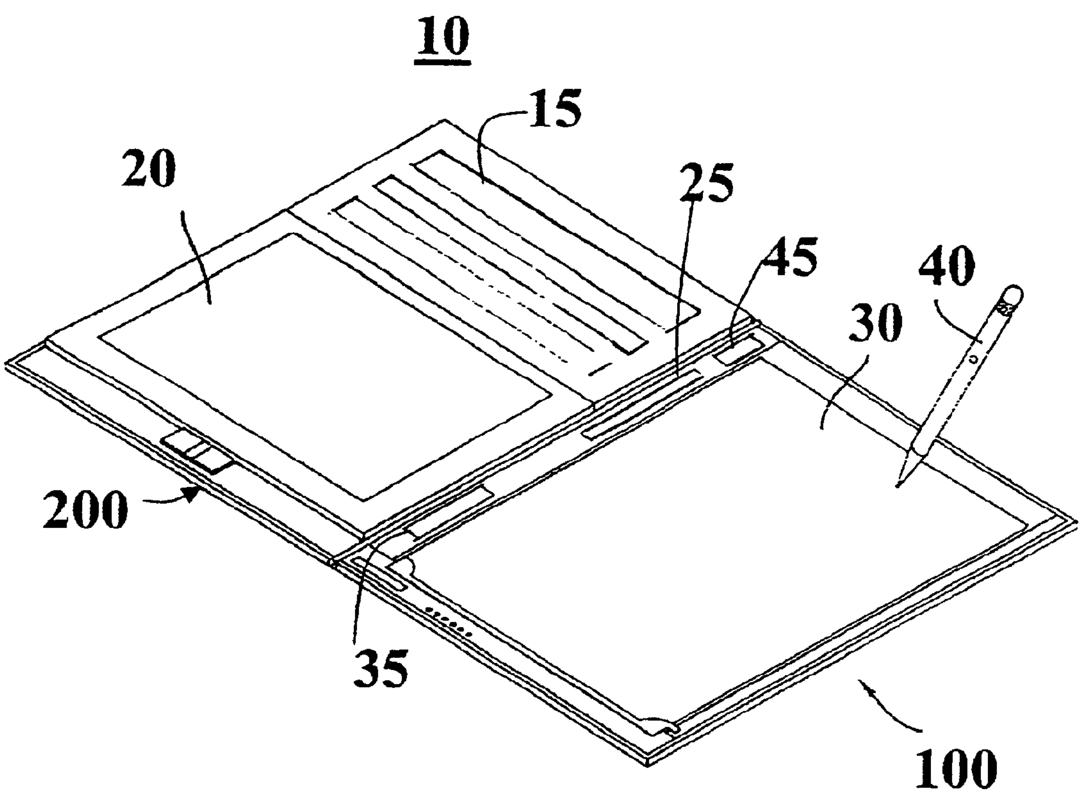
FIG. 1 depicts a computing system comprising an input system in accordance with the teachings herein.

FIG. 1 is depicts an overview of an integrated computing system 10. Computing system 10 includes a computing device such as, but not limited to, a PC (personal computer) 200 interfaced with an input device system. The input device system is, in the presently preferred embodiment, a digitizer input system 100. PC 200 and digitizer input system 100 are shown configured in an integrated unit. The computing system 10 may be laid open as shown; folded shut; and folded over onto itself so that either PC 200 or digitizer input system 100 is operatively exposed for use by a user. Although shown together in an integrated unit, PC 200 and digitizer input system 100 can optionally be housed independently of one another. Integration of the two systems facilitates the portable nature of computing system 10, but is not a requirement for computing system 10.

PC 200 preferably includes a display screen 20, a keyboard 15, a CPU 60 for executing operating system and application instructions, random access memory (RAM) for temporary storage of data, read only memory (ROM) for permanent storage of data, which can include instructions for implementing the PC operating system, and an internal battery (not shown) for providing an electrical source of power to PC 200. PC 200 may also include, or provide means for coupling to, peripheral devices, such as, but not limited to, a network card, memory storage/playback devices (e.g. a read/writeable removable magnetic disk, DVD and CD- ROM players), etc.

Figure 2:
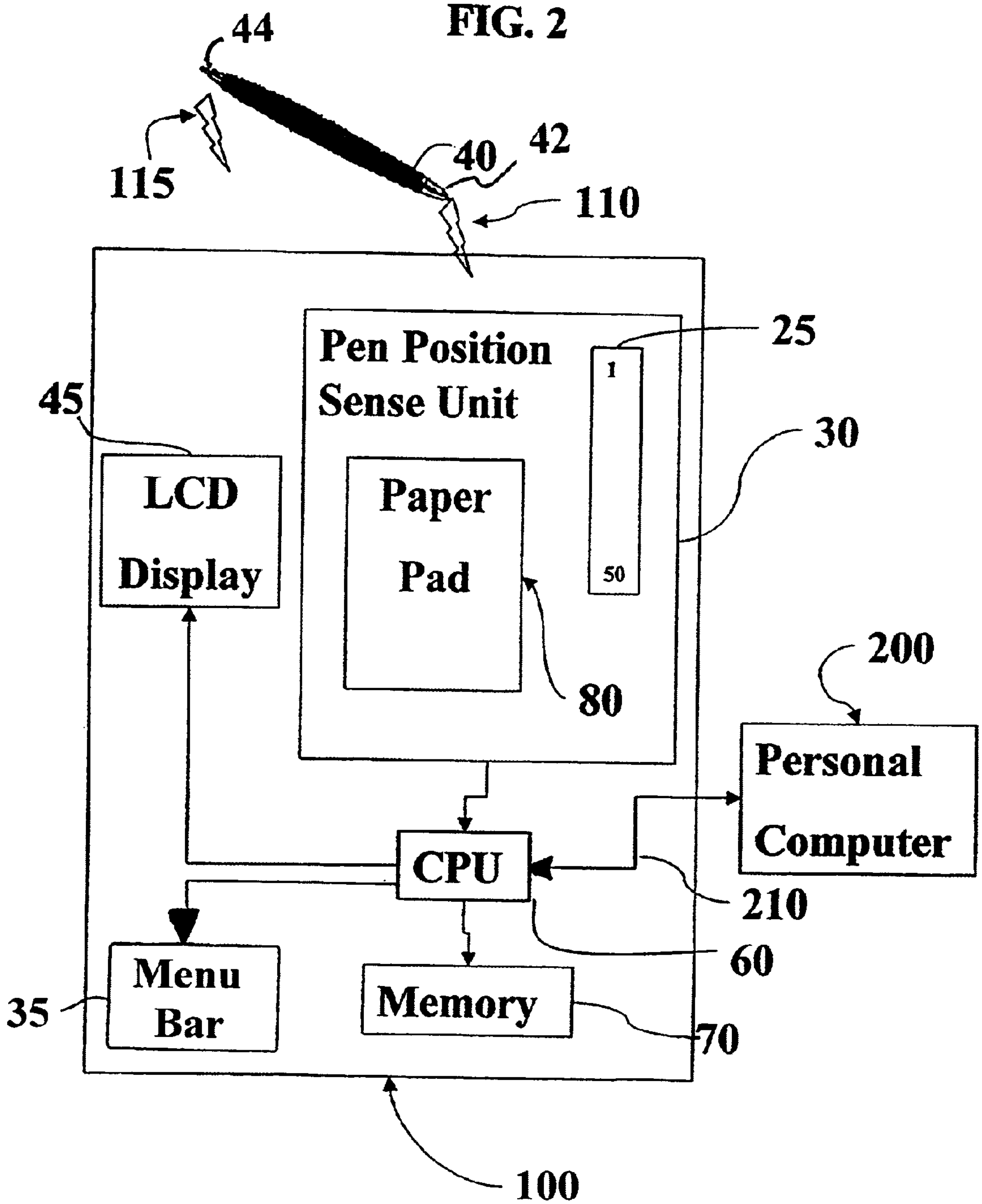
FIG. 2 is a simplified block diagram that illustrates the digitizer input system of FIG. 1 in greater detail.

Digitizer input system 100 includes a digitizer grid 30 that extends, preferably, substantially over the entire area of the digitizer input system 100, or a large portion thereof as depicted in FIG. 2, in order to provide a maximum input working area. The size of the digitizer grid 30 can be varied to meet the constraints of various applications. Digitizer input system 100 operates to track and determine the position of input pen 40 based on RF (radio frequency) signal(s) emitted by input pen 40. Digitizer grid 30 detects the position of input pen 40 based on the relative strength and position of the RF signals emitted by the input pen 40 in relation to digitizer grid 30. Note that the signal(s) emitted and detected by digitizer system 100 need not be limited to RF signals. Other signals such as, for example, ultrasonic and infrared signals (IR) can be employed.

The general operation of digitizer pads is known to those skilled in the art of computer input devices, and as such, will not be discussed in detail herein. Digitizer input system 100 tracks, determines, and records pen positions and pen strokes of input pen 40.

FIG. 2 provides a detailed view of the exemplary computing system 10 depicted in FIG. 1. With reference to FIG. 2, it is shown that digitizer input system 100 includes a CPU 60 and a memory 70. CPU 60 may be a general purpose microprocessor, though not limited to such, for providing system logic and control of digitizer input system 100. Memory 70 is preferably flash RAM, but other forms of memory storage may be used such as, but not limited to, static RAM or a hard drive. Memory 70 provides storage capability for storing pen positions and pen strokes of input pen 40. Digitizer input system 100 also preferably includes a display, such as an LCD display 45, for displaying information related to input data provided by input pen 40, a menu slider 25, and a menu bar 35.

CPU 60 and memory 70 provide local processing and storage, respectively, of input data provided by input pen 40. Since digitizer input system 100 has its own local memory and processing means, PC 200 coupled to digitizer input system 100 need not be relied upon for processing and/or storage of input data received by digitizer input system 100.

Digitizer input system 100 and PC 200 are, in the presently preferred embodiment, coupled together through a bidirectional wired serial communication link 210. Communication link 210 is not limited to a wired connection or a serial communication protocol. Accordingly, communication link may be a wired or wireless communication link (e.g., IR or RF).

Paper pad 80 can be a conventional pad of paper having multiple pages and can be positioned on top of digitizer input system 100. Paper pad 80, positioned atop digitizer grid 30, can be written on by a user of computing system 10. Each time the tip of input pen 40 is pressed to paper pad 80, the digitizer input system 100 begins recording the positional data points detected from the emitted RF signals from input pen 40 and continues to record the input pen 40 positional data until the tip of input pen 40 is lifted from paper pad 80. The set of input pen 40 positional data points from the time of tip press to the time of tip lift is considered to be a pen stroke. Pen strokes written and drawn on paper pad 80 are communicated to digitizer input system 100, even through multiple pages of paper pad 80, by the RF signals emitted from input pen 40. The RF signals emitted from input pen 40 include positional data of the "pen strokes" executed by the user of input pen 40. Thus, the writings and drawings made on paper pad 80 can be conveyed by input pen 40, processed by CPU 60, and stored in memory 70 as an electronic (i.e., virtual) representation of writings and drawings created by the user on paper pad 80.

Input pen 40 preferably has two different tips, tip 42 and tip 44. Dual-tipped input pen 40, as shown in FIG. 2, preferably emits a unique RF signal 110 from tip 42 that is detected by digitizer input system 100. Detected RF signal 110 is used for determining the position of input pen 40 when tip 42 is active. Preferably, input pen 40 emits a different RF signal 115 from tip 44 that is detected by digitizer input system 100. Detected RF signal 110 is used for determining the position of input pen 40 when tip 42 is active. Tip 42 can be, though not necessarily, an inking tip for writing and drawing on paper pad 80. Tip 44, emitting RF signal 115, preferably, but not necessarily, contains a non-inking tip that is used for controlling user input functions of PC 200 coupled to digitizer input system 100. Each of tips 42 and 44 preferably includes a mechanism for detecting when the tip 42 or 44 is active. That is, each tip includes a mechanism for detecting when the tip is pressed down on paper pad 80 (or other writing medium) or digitizer grid 30 directly.

An exemplary RF signal 110 emitted by tip 42 can be a 500 kHz RF signal that is modulated to 480 kHz when tip 42 is active. Exemplary RF signal 115 emitted by tip 42 can be a 450 kHz RF signal that is modulated to 460 kHz when tip 42 is actively used. Digitizer grid 30 detects the relative strength and position of the input pen's emitted RF signals as discussed above. Digitizer grid 30 also detects which tip 42 or 44 is being actively used as indicated by the modulated RF signal detected by digitizer grid 30. The positional data of input pen 40 is communicated to a data steering device. In computing system 10 of the present example, the data steering device is implemented by microprocessor unit CPU 60. CPU 60, in the presently preferred embodiment, can be programmed to perform different functions.

While input pen 40 shown in FIG. 2 has two tips located on opposite ends of input pen 40, input pen 40 may have one or more tips located on the same end thereof. The various tips of input pen 40, or other control mechanisms, may generate additional signals detectable and useable by digitizer input system 100 and/or computing system 10. Selection amongst the various input pen tips by the user preferably only requires a natural, intuitive user action, such as, for example, pressing a small switch located on the barrel of the input pen, in accordance with the teachings herein.

In further accordance with the teachings herein, the signals emitted by tips 42 and 44 are not restricted to RF signals, other types of energy signals may be emitted, such as but not limited to, IR (infrared) and ultrasonic signals. The type of control and user manipulation used for control of the data transfer may be varied.

Written input may be forwarded for storage in a device coupled to digitizer input system 100, such as PC 200, optionally without buffering or caching in local memory 70, as the user writes on paper pad 80. To provide this functionality, CPU 60 can be programmed to steer the user's written input to PC 200 for storage as an electronic version of the user's written input.

In accordance with the present invention, the digitizer input system 100 when interfaced with PC 200 transfers input data received by the digitizer input system 100 to PC 200 using an adaptive transfer policy. The adaptive transfer policy preferably minimizes the impact of data transfers on the power and processing resources of the interfaced computing device, PC 200.

Data, such as stroke information including positional data, received from input pen 40 when a user is actively using inking tip 42, may be, for example, (1) stored in digitizer input system 100 local memory 70; (2) stored in digitizer input system 100 local memory 70, and forwarded to PC 200 at some future time; or (3) not stored in digitizer input system 100 local memory 70, and instead forwarded to PC 200 as the input data is received by digitizer input system 100 (i.e., transferred from digitizer input system 100 to PC 200, optionally without any buffering or storing by digitizer input system 100).

Transfer of input data from digitizer input system 100 through bi-directional communication link 210 to PC 200 invokes the use of systems within PC 200 such as microprocessor(s), memory for storing the transferred input data, and display screen 20 for displaying the transferred input data. The use of PC 200's microprocessor(s), memory, display screen 15, or other associated components requires the use of an electrical power source powering PC 200. In the case that the source of power for the computing device PC 200 is a limited charge source, such as a battery, conservation of the electrical power source, and thus extension of the battery's useful charge is important. In the case that the source of power for the computing device PC 200 is not a battery, such as an A/C power source, conservation of power is less of a concern. Thus, intelligent management of the input system's transfer of input data to the interfaced computing device PC 200 can operatively extend the useful life the PC 200 battery.

In accordance with the teachings herein, stroke information data received by digitizer grid 30 is sent to CPU 60. Digitizer input system 100 makes intelligent decisions about the transfer policy used to control the transfer of stroke data to PC 200. CPU 60 can be instructed to control the transfer of data signals to PC 200 based on an adaptive transfer policy. For example, a power management status of PC 200 may be used as a basis for a transfer policy. Preferably, the control of data signal transfer is executed without intervention from the user. That is, in a preferred embodiment, CPU 60 determines whether to transfer or not transfer data to PC 200 based on the transfer policy.

For example, CPU 60 automatically detects the operating status of interfaced PC 200 via bi-directional communication link 210 and manages the transfer of data thereto without instruction from a user. CPU 60 monitors the operating status of PC 200 and intelligently adapts the data transfer policy in response to the detected operating status of PC 200 so that the useful charge of the PC 200 battery is extended. The digitizer input system 100 preferably implements the transfer policy automatically, without required intervention from the user. It is also a feature of the teachings herein that the user may select the particular transfer policy and desired criteria to be used by the adaptive transfer policy.

As an example of an adaptive transfer policy for extending the battery life of PC 200, PC 200 may be configured through a conventional power management interface to reside in one of three general states of operation. In particular, PC 200 may be in an Off state; in an On/Low Power state, or in an Normal/High Power state. CPU 60 may poll PC 200 over communication link 210 to receive PC 200 operating status signals. When digitizer input system 100 detects from a lack of response that the PC 200 is Off, and hence input data cannot be transferred to PC 200, the input data from digitizer grid 30 is directed by CPU 60 to local memory 70. When PC 200 is in the On/Low Power state, as automatically detected by digitizer input system 100 over communication link 210, the input data from digitizer grid 30 is transferred to PC 200 periodically. The periodic transfer of data thus only requires the periodic use of PC 200 power and an efficient use of the PC 200 battery is obtained. The time interval for transfer of data can preferably be based on the rate of pen stroke information that is detected and/or on the total number of pen strokes recorded in memory 70. That is, the input data of digitizer input system 100 is transferred to PC 200 after some amount of time and/or number of pen strokes have been detected and recorded by digitizer input system 100.

In the third operating state of PC 200, as automatically detected by digitizer input system 100, when the CPU 60 determines that PC 200 is operating in the Normal /High Power state the CPU 60 controls the immediate transfer of data signals to PC 200, optionally without buffering in local digitizer input system 100. When the input data is transferred immediately to PC 200, the PC 200 can operate in a most responsive condition, as compared to the OFF and On/Low Power states.

CPU 60 can perform the function of determining the status of PC 200 based on queries of the PC 200 operating state over communication link 210. Other processing and control devices may be included in digitizer system 100 to perform the PC 200 operating status determination tasks. Further, it is preferable that digitizer input system 100 automatically monitor and detect the operating configuration of PC 200, including the local power management configuration settings of PC 200 and/or response adapt a transfer policy consistent with the power management settings and operating state of PC 200.

Figure 3:
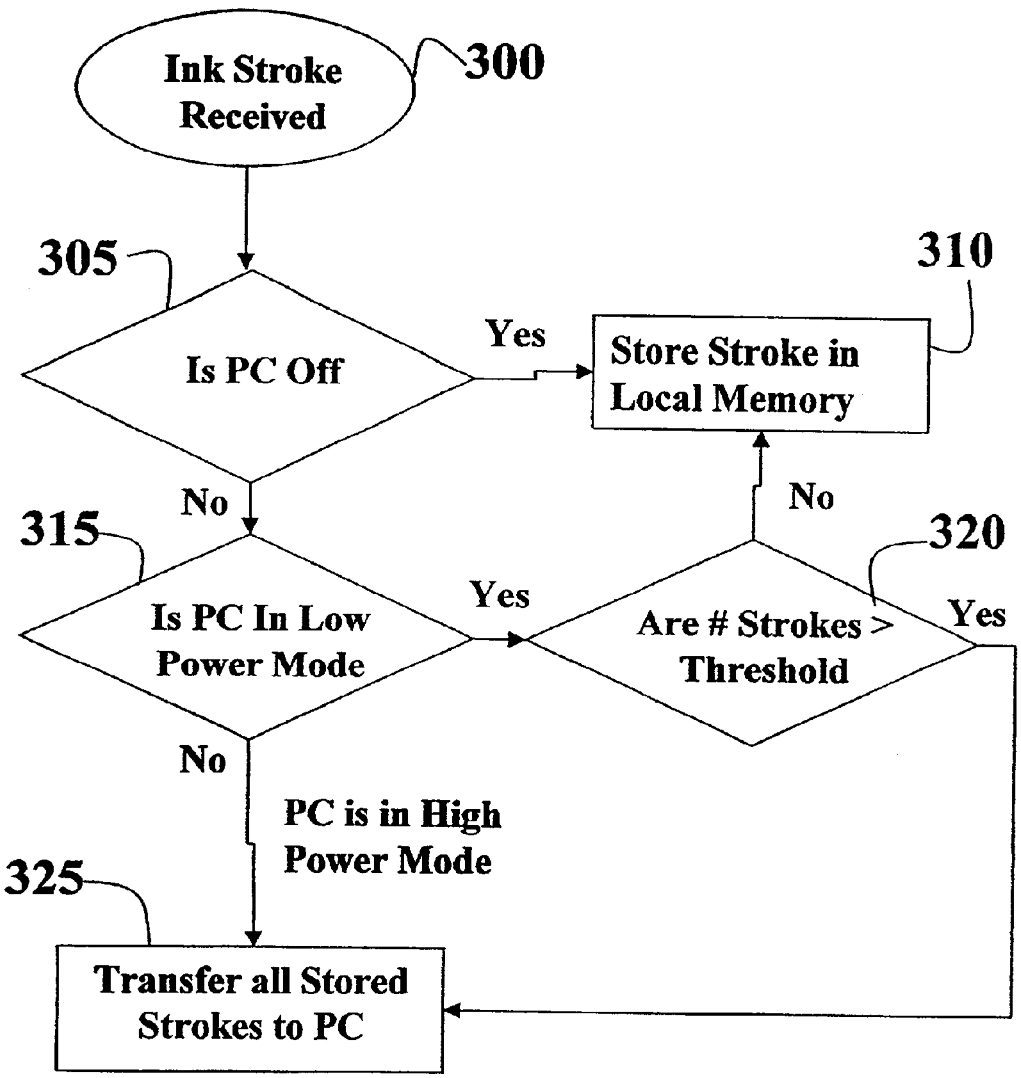
FIG. 3 is a flow diagram of an exemplary method used by the digitizer input system to extend the battery life of the PC interfaced with the digitizer input system in accordance with the teachings herein.

FIG. 3 illustrates a logical flow diagram of an exemplary method used by a computing system embodying the teachings herein. In particular, a pen stroke executed by the user moving inking tip 42 of input pen 40 is received by digitizer grid 30 (step 300). CPU 60 determines whether PC 200 is Off, as indicated in signals received from PC 200 via bi-directional communication link 210 (step 305). If it is determined that PC 200 is Off, then the received pen stroke information is not transferred to PC 200 and the pen stroke information is stored in local memory 70 (step 310). Thus, PC 200 does not have to be turned on for storage of the received pen stroke information to occur. If it is determined that PC 200 is not Off (step 305), then it is determined whether PC 200 is operating in the On/Low Power state (step 315). If it is determined that PC 200 is in the On/Low Power state, a next determination is whether some criterion such as a threshold number of pen strokes in accordance with the transfer policy, have been detected by digitizer input system 100 (step 320). When a determination is made that the threshold number of pen strokes stored in local memory 70 has not been exceeded, the received pen stroke information is not transferred to PC 200, and the stroke information is stored in local memory 70 (step 310). If it is determined that the threshold number of pen strokes stored in local memory 70 has been exceeded (step 320), then the received pen stroke information is transferred to PC 200 (step 325).

Referring back to step 315, if it is determined (step 315) that PC 200 is not operating in the On/Low Power state (i.e., operating in the Normal /High Power state), then the received pen stroke information is preferably transferred directly and immediately to PC 200 (step 325). In the case of an immediate, direct transfer to PC 200, the stroke information may or may not also be stored in digitizer input system 100.

The transfer policy of the present invention is not limited to the example shown in FIG. 3. The transfer policy may be based on other criteria such as, but not limited to, the rate of pen stroke information detection. For example, as the user increases the rate at which written input is detected by the digitizer input system 100 by increasing the user's handwriting rate on paper pad 80 (or other writing medium), the transfer policy of the present invention can adapt to the changing circumstances by increasing the frequency of data transfers from digitizer input system 100 to PC 200. Conversely, as the user's handwriting rate on paper pad 80 decreases, the transfer policy of the present invention can adapt by decreasing the frequency of data transfers from digitizer input system 100 to PC 200. In this manner, the transfer policy of the present invention can maintain a certain level of responsiveness between digitizer input system 100 and PC 200 by adjusting the transfer rate of pen stroke information while extending the life of the PC 200 battery.

Another transfer policy criterion may include, but is not limited to, a time interval between data transfers. The user may select, for example, a transfer policy based on the interval of time between data transfers from digitizer 100 to PC 200. The time intervals may be selected from, as an example, a high, a medium, and a low transfer interval. Other user-selected transfer policy settings are possible within the scope of the present invention. The transfer policy may be based on the various criteria discussed above, and others, in combination and individually. For example, the transfer policy can be set to transfer data every two minutes. The transfer policy may, however, adapt to changing operational circumstances by transferring data every one minute if the user increases the flow of handwritten input. The transfer policy may thus, automatically adapt to changing patterns of user input. The transfer policy is thus adaptive.

Although described above in the context of specific input device systems and companion systems, those skilled in the art should appreciate that these are exemplary and indicative of presently preferred embodiments of these teachings, and are not to be read or construed in a limiting sense upon these teachings.

For example, the digitizer input system 100 may also accept user input in the form of audible signals, keyboard or keypad entries, and/or other types of user input data entry devices.

As another example, the transfer policy of the present invention may be implemented by a computer readable storage medium (e.g., a memory card, a hard disk or a compact flash card readable by digitizer system 100) having program instructions embodied therein for executing the methods of the present invention. Accordingly, the selective transfer of information from an input system to an interfaced computing device can be implemented by a computer reading the storage medium where the storage medium includes program instructions for: detecting a signal emitted from a pen input device of digitizer 100; program instructions for determining an operational state of interfaced PC 200; and program instructions for selectively transferring or not transferring the stroke information from digitizer 100 to interfaced PC 200 depending on the state of PC 200 carrying out further aspects of this invention.

The various aspects of the teachings herein may or may not be combined in accordance with the scope of the teachings herein and the claims appended hereto. Thus, while the invention has been particularly shown and described with respect to preferred embodiments thereof, it will be understood by those skilled in the art that changes in form and details may be made therein without departing from the scope and spirit of the invention.

What we claim is:

1. A computing system, said computing system comprising:

a first computing device comprising local storage and a detector for detecting signals emitted from a pen input device for generating stroke information therefrom; and a second computing device coupled to said first computing device, wherein said detected stroke information is selectively transferred or not transferred to said second computing device based on an adaptive transfer policy that is dependent at least on a power state of said second computing device.

2. The computing system of claim 1 wherein said transfer policy automatically adapts to a power state of said second computing device.

3. The computing system of claim 1 wherein said transfer policy automatically adapts to extend a battery life of said second computing device.

4. The computing system of claim 2, wherein said second computing device resides in a power state selected from one of an Off state, an On/Low Power state, and a Normal/High Power state.

5. The computing system of claim 1, wherein said transfer policy of said stroke information is based on a user-selected setting.

6. The computing system of claim 5, wherein said user-selected setting is based on at least one of a transfer interval or a rate of stroke information detection.

7. The computing system of claim 1, wherein said transfer of said stroke information is based on one of an amount of stroke information stored in said local storage, a duration of stroke information detection and a rate of stroke information detection.

8. The computing system of claim 1, wherein said transfer policy is based on a power management configuration of said second computing device.

9. The computing system of claim 1, wherein said transfer policy automatically adapts to a change in a pattern of the detected user input.

10. A method for selectively transferring information from a first computing device to a second computing device of a computing system, said steps comprising:

detecting an emitted signal from a pen input device of a first computing device for generating stroke information therefrom;

determining a power state of said second computing device; and transferring or not transferring said stroke information from said first computing device to said second computing device in accordance with a transfer policy that at least depends on said determined power state.

11. The method of claim 10 wherein said transfer policy automatically adapts to extend a battery life of said second computing device.

12. The method of claim 10, wherein said power state is selected from one of an Off state, an On/Low Power state, and a Normal/High Power state.

13. The method of claim 10, wherein said transfer policy of said stroke information is dependent on a user-selected setting.

14. The method of claim 13, wherein said user-selected setting is either a transfer interval or a rate of stroke information detection.

15. The method of claim 10, wherein said transfer of said stroke information is based on one of an amount of stroke information stored in a local storage, a duration of stroke information detection and a rate of stroke information detection.

16. The method of claim 10, wherein said transfer policy is based on a power management configuration of said second computing device.

17. The method of claim 10, wherein said transfer policy is based on a change in a pattern of the detected user input.

18. A storage medium having computer readable program instructions embodied therein for selectively transferring information from a first computing device to a second computing device of a computing system, said storage media comprising:

program instructions for detecting a signal emitted from a pen input device of a first computing device for generating stroke information therefrom;

program instructions for determining a power state of said second computing device; and program instructions for transferring or not transferring said stroke information from said first computing device to said second computing device depending at least on said determined power state.

19. The storage medium of claim 18 further including program instructions for automatically adapting said transfer policy to extend a battery life of said second computing device.

20. The storage medium of claim 18 further including program instructions for determining said power state of said second computing device from one of an Off state, an On/Low Power state, and a Normal/High Power state.

21. The storage media of claim 18 further including program instructions for basing said transfer policy of said stroke information on a user-selected setting.

22. The storage media of claim 21 further including program instructions for determining whether said user-selected setting is either a transfer interval or a rate of stroke information detection.

23. The storage media of claim 18 including program instructions for basing said transfer of said stroke information on one of an amount of stroke information stored in said local storage, a duration of stroke information detection, and a rate of stroke information detection.

24. The storage media of claim 18 further including program instructions for basing said transfer of said stroke information on a power management configuration of said second computing device.

25. The storage media of claim 18 further including program instructions for basing said transfer of said stroke information on a change in a pattern of the detected user input.

26. A computing system, said computing system comprising:

a first computing device comprising local storage and a detector for detecting user input to said first computing device; and a second computing device coupled to said first computing device, wherein said detected user input is transferred to said second computer based on an adaptive transfer policy that is dependent at least on a power state of said second computing device.

27. The computing system of claim 26 wherein said transfer policy automatically adapts to a power state of said second computing device.

28. The computing system of claim 27 wherein said second computing device resides in a power state selected from one of an Off state, an On/Low Power state, and a Normal/High Power state.

29. The computing system of claim 26 wherein said transfer policy automatically adapts to a change in a pattern of the detected user input.

30. The computing system of claim 26 wherein said detector detects audible signals.

31. The computing system of claim 26 wherein said detector detects signals emitted from a pen input device for generating stroke information.

32. The computing system of claim 26 wherein said detector detects keyboard or keypad entries.

* * * * *